United States Patent
Botti et al.

(10) Patent No.: US 9,565,196 B1
(45) Date of Patent: Feb. 7, 2017

(54) TRUST LEVEL MODIFIER

(71) Applicant: INTERNATIONAL BUSINESS MACHINES CORPORATION, Armonk, NY (US)

(72) Inventors: Derek Botti, Holly Springs, NC (US); Ramamohan Chennamsetty, Hopewell Junction, NY (US); Anji Greene, Austin, TX (US); Charles S. Lingafelt, Durham, NC (US); William H. Tworek, Hopkinton, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/210,969

(22) Filed: Jul. 15, 2016

Related U.S. Application Data

(63) Continuation of application No. 14/950,335, filed on Nov. 24, 2015.

(51) Int. Cl.
*H04L 29/06* (2006.01)

(52) U.S. Cl.
CPC ......... *H04L 63/105* (2013.01); *H04L 63/1433* (2013.01)

(58) Field of Classification Search
CPC ........................... H04L 63/105; H04L 63/1433
See application file for complete search history.

(56) References Cited

U.S. PATENT DOCUMENTS

| 7,284,124 B1 | 10/2007 | Ginsberg |
| 7,676,843 B1 | 3/2010 | Stott et al. |
| 7,774,620 B1 | 8/2010 | Stott et al. |
| 8,176,336 B1 | 5/2012 | Mao et al. |
| 8,387,115 B2 | 2/2013 | Park |
| 8,443,189 B2 | 5/2013 | Li et al. |
| 8,752,142 B2 | 6/2014 | Bailey, Jr. |

(Continued)

FOREIGN PATENT DOCUMENTS

EP 27344949 A1 5/2014

OTHER PUBLICATIONS

Kekkonen et al.; "Towards Trusted Environment in Cloud Monitoring", 2014 IEEE 11th International Conference Information Technology: New Generations, 2014 IEEE 11th International Conference on, Apr. 7-9, 2014, pp. 180-185.

(Continued)

*Primary Examiner* — Darren B Schwartz
(74) *Attorney, Agent, or Firm* — Kristofer L. Haggerty

(57) ABSTRACT

A computer establishes normal activity levels of a factor associated with an application, system, network, or computing environment. The computer receives rules prescribing the trust levels assigned to users or devices during normal and abnormal activity levels exhibited by the factor. The computer monitors the activity level exhibited by the factor and determines whether the activity is normal or abnormal. If the computer determines that the factor is exhibiting abnormal activity, the computer modifies the trust level of associated users and devices according to the rules. The computer continues to monitor the activity of the factor until the computer determines that normal activity levels of the factor have returned, at which point the computer modifies the trust level of associated users or devices according to the rules.

1 Claim, 3 Drawing Sheets

(56) References Cited

U.S. PATENT DOCUMENTS

| | | | |
|---|---|---|---|
| 8,925,053 B1* | 12/2014 | Mehta | G06F 21/31 713/155 |
| 8,965,340 B1* | 2/2015 | Biger-Levin | H04W 12/06 455/411 |
| 8,973,158 B2 | 3/2015 | Abraham et al. | |
| 8,984,601 B2 | 3/2015 | Gagliano | |
| 9,203,860 B1* | 12/2015 | Casillas | H04L 63/1433 |
| 2003/0041255 A1 | 2/2003 | Chen et al. | |
| 2003/0105979 A1* | 6/2003 | Itoh | H04L 12/5855 726/24 |
| 2005/0228770 A1* | 10/2005 | Willamson | G06F 21/316 |
| 2007/0022468 A1* | 1/2007 | Iijima | H04L 63/0209 726/3 |
| 2007/0094711 A1* | 4/2007 | Corley | G06F 21/53 726/3 |
| 2007/0192588 A1* | 8/2007 | Roskind | G06F 21/31 713/155 |
| 2008/0028442 A1* | 1/2008 | Kaza | G06F 21/56 726/4 |
| 2009/0288161 A1 | 11/2009 | Wei et al. | |
| 2010/0077445 A1* | 3/2010 | Schneider | G06F 21/52 726/1 |
| 2011/0238984 A1* | 9/2011 | Roush | G06F 21/53 713/166 |
| 2012/0151559 A1* | 6/2012 | Koudys | G06F 21/316 726/3 |
| 2012/0185910 A1* | 7/2012 | Miettinen | G06F 21/31 726/1 |
| 2013/0019317 A1 | 1/2013 | Whelan et al. | |
| 2013/0047248 A1* | 2/2013 | Radhakrishnan | G06F 21/335 726/11 |
| 2013/0145463 A1* | 6/2013 | Ghosh | G06F 21/56 726/22 |
| 2013/0227712 A1 | 8/2013 | Salem et al. | |
| 2013/0232562 A1* | 9/2013 | Rodriguez | G06F 21/316 726/5 |
| 2013/0291098 A1 | 10/2013 | Chung et al. | |
| 2014/0006003 A1 | 1/2014 | Soricut et al. | |
| 2014/0109220 A1* | 4/2014 | Inkumsah | G06F 21/316 726/19 |
| 2014/0208419 A1* | 7/2014 | Chang | G06F 21/31 726/21 |
| 2014/0283031 A1 | 9/2014 | Eksten et al. | |
| 2014/0344896 A1* | 11/2014 | Pak | H04W 12/06 726/4 |
| 2015/0127660 A1 | 5/2015 | Zilberberg et al. | |
| 2015/0222641 A1* | 8/2015 | Lu | G06F 21/57 726/1 |
| 2015/0242605 A1* | 8/2015 | Du | G06F 21/32 726/7 |
| 2015/0381631 A1* | 12/2015 | Salem | H04L 63/102 726/4 |
| 2016/0103996 A1* | 4/2016 | Salajegheh | G06F 11/3024 726/25 |
| 2016/0180078 A1* | 6/2016 | Chhabra | G06F 21/31 726/19 |
| 2016/0188878 A1* | 6/2016 | Kulkarni | G06F 21/56 726/23 |
| 2016/0241561 A1* | 8/2016 | Bubany | H04L 63/102 |

OTHER PUBLICATIONS

Lu et al.; "Two-Level Trust Federation Model for Cross-Domain Environment", 2011 IEEE International Conference on Network Computing and Information Security, 2011 IEEE International Conference on, vol. 2, May 14-15, 2011, pp. 264-269.

Zhu et al.; "A Trust Level Based Authentication Mechanism Crossing Domains", Information and Communications Technologies, 2014 IEEE International Conference on, May 15-17, 2014, pp. 1-5.

IBM: List of IBM Patents or Patent Applications Treated as Related (Appendix P), Sep. 28, 2016, pp. 1-2.

Botti et al., Pending U.S. Appl. No. 14/950,335, filed Nov. 24, 2015, titled "Trust Level Modifier," pp. 1-31.

* cited by examiner

TRUST LEVEL MODIFIER

TECHNICAL FIELD

The present invention relates generally to data security, and more particularly to modifying the trust level associated with a user and/or device based on measured environmental changes.

BACKGROUND

The rules governing access to an application or resource within a given compute environment are frequently defined by trust levels wherein the trust level assigned to a user or device dictates the permissions and restrictions applied to the user or device. As the name suggests, trust levels vary in degrees such that differing trust levels provide different permissions and restrictions to different resources and applications. As such, users and devices are assigned a specific trust level which, under normal circumstances, provides adequate permissions to fulfill whatever business they have with the resource or application. Typically, gaining the permissions associated with a trust level is performed by verifying the credentials of the user or device assigned the trust level. While gaining access to an assigned trust level through credential verification is effective, this method fails to take into account changes in the internal and external environment prior to providing the permissions granted by an associated trust level.

SUMMARY

Embodiments of the present invention disclose a method, system, and computer program product for a trust level modifier. A computer establishes normal activity levels of a factor associated with an application, system, network, or computing environment. The computer receives rules prescribing the trust levels assigned to users or devices during normal and abnormal activity levels exhibited by the factor. The computer monitors the activity level exhibited by the factor and determines whether the activity is normal or abnormal. If the computer determines that the factor is exhibiting abnormal activity, the computer modifies the trust level of associated users and devices according to the rules. The computer continues to monitor the activity of the factor until the computer determines that normal activity levels of the factor have returned, at which point the computer modifies the trust level of associated users or devices according to the rules.

DETAILED DESCRIPTION

Embodiments of the present invention will now be described in detail with reference to the accompanying figures.

Figure 1:
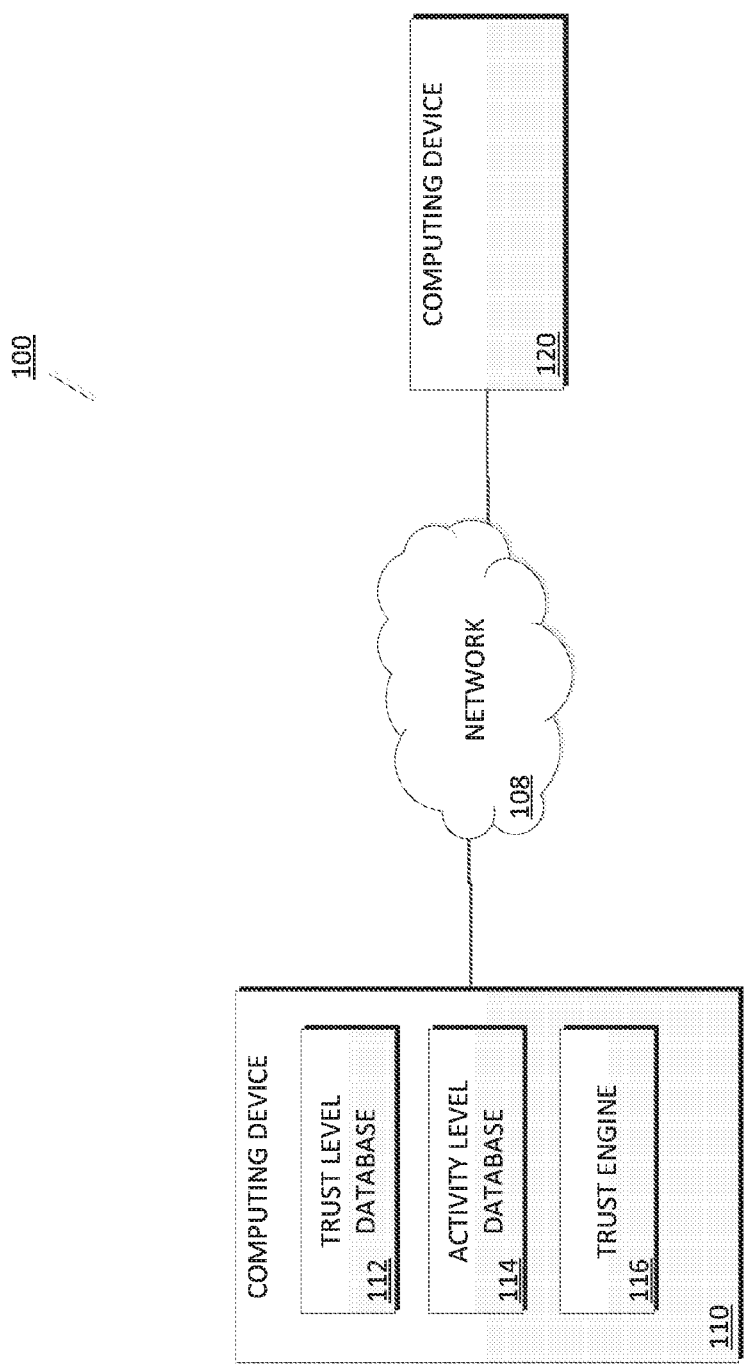
FIG. 1 illustrates trust level modifying system 100, in accordance with an embodiment of the invention.

FIG. 1 illustrates a trust level modifying system 100, in accordance with an embodiment of the invention. In the example embodiment, trust level modifying system 100 includes network 108 computing device 110, and computing device 120.

In the example embodiment, network 108 may be the Internet, representing a worldwide collection of networks and gateways to support communications between devices connected to the Internet. Network 108 may include, for example, wired, wireless or fiber optic connections. In other embodiments, network 108 may be implemented as an intranet, a local area network (LAN), or a wide area network (WAN). In general, network 108 can be any combination of connections and protocols that will support communications between computing device 110 and computing device 120.

In the example embodiment, computing device 120 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 120 is shown as a single device, in other embodiments, computing device 120 may be comprised of a cluster or plurality of computing devices, working together or working separately. Computing device 120 is described in more detail with reference to FIG. 3.

In the example embodiment, computing device 110 includes trust level database 112, activity level database 114, and trust engine 116. In the example embodiment, computing device 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 3.

Trust level database 112 is an organized collection of trust levels detailing the permissions attached to objects, such as who is permitted access an object and what operations (if any) are permitted on the object. In the example embodiment, each trust level detailed in trust level database 112 corresponds to a different level of permissions dictating access and/or restrictions to an object such as a file, application, system, network, or environment. For example, trust level 1 for an object such as a document may deny both read and write permissions. Conversely, trust level 2 for the same document may provide read permission and deny write permission, while trust level 3 for the document provides both read and write permissions. Each trust level and the corresponding permissions are then assigned to a user or device such that the user or device is provided access to the file, application, system, network, or environment in accordance with the assigned trust level. Continuing the example above, if user Alpha is assigned a trust level of 2 for the document, then a user logged in as Alpha is only provided read permission for the document. Similarly, if a device, such as a computer, is assigned trust level of 3, then the computer and anyone using the computer can both read and write to the document. In the example embodiment, trust level conflicts between users and devices are resolved by assigning the lesser trust level of the conflicting trust levels, however in other embodiments, conflicts between trust levels may be resolved by assigning the greater trust level or other means.

In the example embodiment, activity level database 114 is an organized collection of data detailing the normal activity levels of factors corresponding to files, applications, systems, networks, or environments. In the example embodiment, the activity levels of the selected factors are taken into consideration along with the credentials of a user or device to determine the trust level assigned to the user/device. The normal activity levels detailed in activity level database 114 are indicative of the normal capacity, load, traffic, or access statistics of the associated file, application, system, network, or environment and are used to determine when the activity level of the factor is abnormal.

Trust engine 116 is a program capable of establishing rules which dictate the trust levels associated within a file, application, system, network, and environment during normal and abnormal activity. Trust engine 116 is additionally capable of establishing the normal activity levels of a factor associated with a file, application, system, network, and environment as well as periodically measuring said activity levels. Trust engine 116 is further capable of determining whether the measured activity levels of the factor deviate from the normal activity levels of the factor and modifying the trust level associated with a user or device based on said determination.

Figure 2:
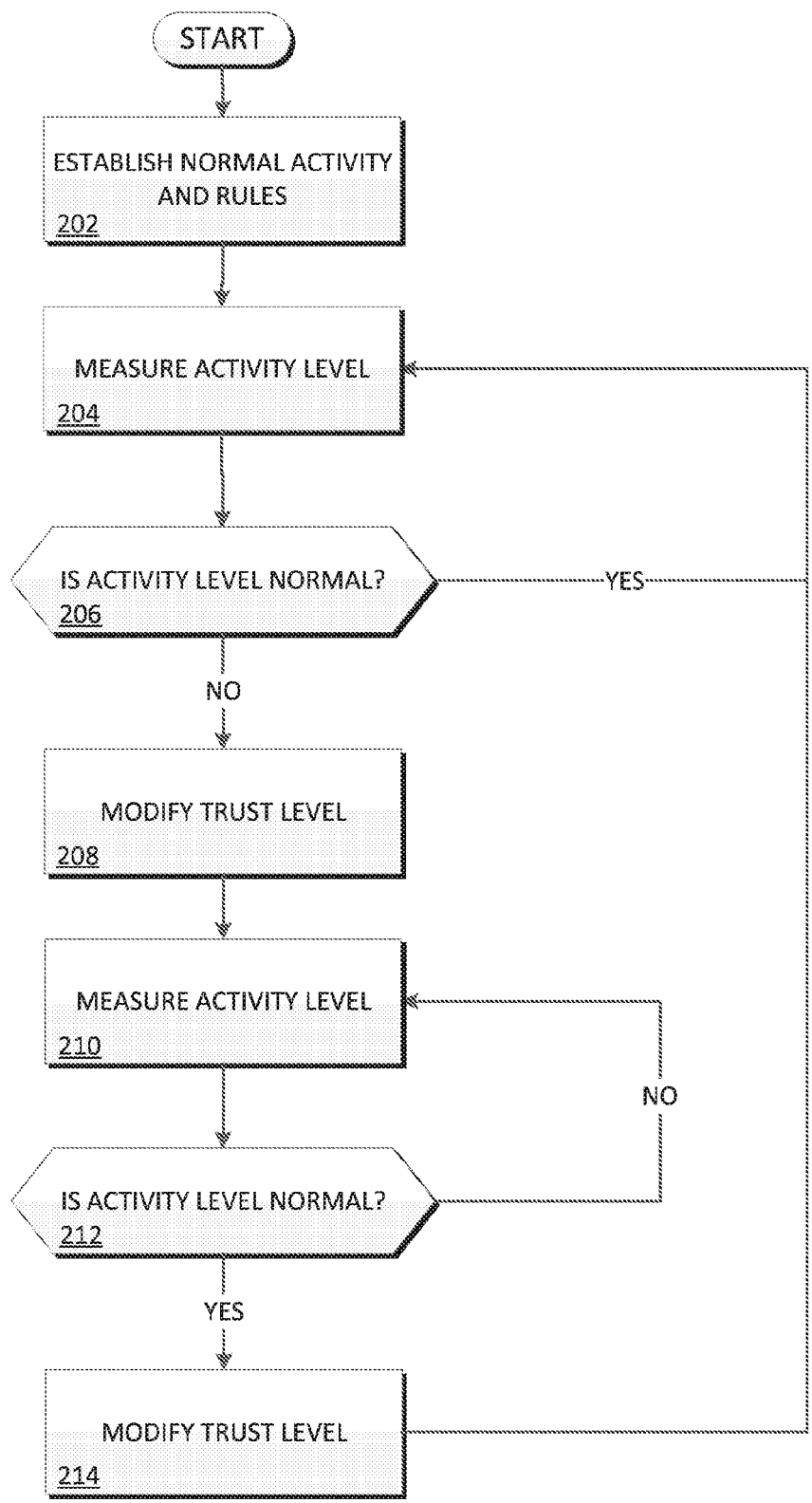
FIG. 2 is a flowchart illustrating the operations of trust engine 116 of FIG. 1 in modify a trust level based on normal and abnormal activity, in accordance with an embodiment of the invention.

FIG. 2 is a flowchart depicting the operation of trust engine 116 in modifying the trust level assigned to a user or device based on the measured activity levels of a file, application, system, network, or environment.

Trust engine 116 establishes normal activity levels and rules dictating the trust levels assigned to a user or device during normal and abnormal activity levels (step 202). In the example embodiment, trust engine 116 establishes the normal activity levels of factors associated with files, applications, systems, networks, and environments selected by a user within a user interface of trust engine 116. Because the relevant factors of each file, application, system, network, and environment may vary significantly, the means of measuring and defining the normal activity level is largely based on the nature of the factor. For example, trust engine 116 may measure the normal activity level of a factor such as resource consumption using a meter while trust engine 116 may measure the normal activity level of a factor such as login attempts by simply maintaining a count. In addition, factors selected by the user may be applicable to multiple applications, systems, networks, and environments, or be mutually exclusive of each other (for instance, the factor login attempts may be applicable to both an application and system, but may not be applicable to an environment). In the example embodiment, trust engine 116 establishes the normal activity levels of the factors by measuring the activity levels of connected applications, systems, networks, and environments for extended periods of time and determining an average, or alternatively, a mean activity level (or range). In other embodiments, however, trust engine 116 may establish the normal activity levels of the factors by other means, such as user input of a specific range, level, value, etc. for each factor.

In the example embodiment, trust engine 116 establishes the normal activity level of factors corresponding to a file, application, system, network, or environment. Such factors include access control factors, such as the number of access requests (total and per user), number of failed access requests, number of failed access requests prior to gaining access, number of successful access requests, number of locked out users (users who exceeded the failed access request limit), number of users with concurrent access, and overall percentage of registered users with concurrent access. For example, if trust engine 116 measures the activity level for the factor: amount of log-ins per hour on a mobile banking application, then trust engine 116 counts the amount of users who login to the online banking application for a user-defined period of time, such as a week, and establishes a normal activity level of, on average, a minimum of 500 users and maximum of 1000 users login per hour. Similarly, trust engine 116 may also determine the normal activity levels for specific hours of the day, days of the week, and weeks of the year. Continuing the mobile banking application example above, the hourly, normal level of activity between the hours of 8:00 AM and 9:00 AM may be 400 to 600 users. Alternatively, a user may configure trust engine 116 to define the normal activity level otherwise, such as defining the normal activity level to be within a percentage/tolerance of the average. Continuing the example above where an average of 500 to 1000 users access the mobile banking application per hour, if trust engine 116 is configured to define the normal level of activity as ±10% of the average normal activity level, then access control list determines an average of 750 users per hour and defines the normal activity level at 675 to 825 users per hour (750±10%). Trust engine 116 additionally establishes the normal activity levels of other factors in a similar manner, such as resource consumption factors per hour/day/week/year/event, the number of inter-application communications, the type of inter-application communication, and the changes to security posture of a communicating application. In the example embodiment, trust engine 116 further establishes the normal activity levels of security and vulnerability analytics, such as aggregated threat indexes, levels of attack, threat level prescribed by a security operational center, vulnerability scanning indexes, antivirus activity, and the number on non-security ports open in the environment.

In addition to establishing the normal activity levels of factors associated with files, applications, systems, networks, and environments, trust engine 116 additionally establishes rules dictating the trust levels assigned to users and devices during normal and abnormal activity of said factors. In the example embodiment, the established rules define the trust level for a user or device during normal levels of activity of the factor and may allow for modification of the trust level assigned to a user/device upon detection of abnormal activity levels. Modifications made to the trust level during abnormal activity may include changing the trust level to the next most restricted/unrestricted level of trust (±1 trust level) or changing the trust level to a specific trust level (maximum trust/minimum trust/trust level 2, etc.). Furthermore, specific trust levels can be assigned to differing degrees of measured abnormality, such as assigning the next most restrictive trust level during slightly abnormal activity and the most restrictive trust level during highly abnormal activity. Continuing the example with the mobile banking application, if the normal activity level of the mobile banking application averages between 500-1000 users per hour, then the rules for the application may provide that during normal levels of activity users are assigned a trust level of 3, providing each user the ability to transfer, withdraw, and deposit money. Furthermore, if experiencing a large or small volume of users is an indication of a security threat, then the rules may also provide that during slightly abnormal levels of activity, such as 1000-1250 users/hour, users are assigned a trust level of 2, providing users the ability to deposit money. Additionally, the rules may prescribe that during highly abnormal levels of activity, such as 1250+ users/hour, users are assigned a trust level of 1, only providing each user the ability to view their accounts. Other rules may alter the trust level during peak activity hours/days/weeks/months or add a tolerance to the established activity levels during prescribed times. Continuing the example above, if the bank experiences a high volume of logged in users on Tuesdays following a holiday Monday, then the rules for the application may provide that on Tuesdays following a holiday Monday, normal activity levels are increased by ten percent, or 550-1100 users per hour (note that this rule can be avoided if trust engine 116 is configured to establish the normal activity level of every day of the year and has established the heightened activity levels on each Tuesday following a Monday holiday. Similarly, a user may manually input the heightened activity level as the normal activity level through user input). In other embodiments, rules may prescribe alternative trust level modifications based on whether the abnormal activity is greater than or less than the normal activity level.

Trust engine 116 measures the activity level of an application, system, network, and environment (step 204). In the example embodiment, trust engine 116 measures the activity level of each factor designated by the user in step 202. The manner in which each designated factor is measured varies depending on the data measured and nature of the factor. In the example embodiment, trust engine 116 is configured to measure certain factors, such as a count of occurrences or change in state, continuously so each measured event is immediately accounted for. Trust engine 116 is additionally configured to measure other factors, such as rates of resource consumption or network traffic, periodically as specified by the user. Trust engine 116 may be further configured to average such periodic measurements over a period of time to avoid false positives due to outliers. Continuing the example above of the online banking application, if the normal activity level is a count of logged in users per hour, then trust engine 116 is configured to continuously monitor the online banking application for the occurrence of a user logging in.

Trust engine 116 determines whether the activity level of an application, system, network, or environment is normal (decision 206). In the example embodiment, the method of determining whether the activity level is normal may be configured by the user to compute a variety of statistical analyses and comparisons. For example, when the normal activity level of a factor is defined by a range, a level of activity (or a range corresponding to the level of activity) may be considered normal by determining if the count of occurrences, average rate, or range of values (or average range) corresponding to the level of activity is within the range of normal activity. Similarly, the determination may also involve determining whether the measured activity level falls within a tolerance of the average normal activity level, such as within a standard deviation or percentage of the average. In other situations where the normal activity level of a factor is a value or level, such as a type of inter-application communication or threat level, determining whether the activity is normal is a comparison of the normal value with the measured value. Determining whether the measured activity level of a factor is considered normal in light of the established normal activity level is primarily dependent on the factor and the manner in which the comparison is made, making the comparison for certain factors heavily depended on the configuration selected by the user.

In some cases, accurate representations of recent activity levels may be difficult to ascertain without proper configuration (decision 206 cont'd). For example, in the online banking application example above where users per hour averages between 500 and 1000 users, if trust engine 116 records the users per hour every hour and a user attempts to login at 12:20 PM, then determining whether the number of users per hour between 12:00 PM and 1:00 PM is normal (within 500-1000 users) will be difficult to accurately determine at 12:20 PM because only twenty minutes have elapsed. Thus, in the example embodiment, the user may configure trust engine 116 to avoid such inaccuracies through means such as measuring the hour of activity retroactively from the time the login is attempted. Therefore, if the user attempts to login at 12:20 PM, the hour of activity if measured from 11:20 AM to 12:20 PM rather than 12:00 PM to 1:00 PM. In cases where this method is inapplicable, such as if the time is 8:10 AM and the bank application is only available after 8:00 AM, other means to correct inaccuracies must be implemented. Other means for avoiding such inaccuracies may include measuring activity level more frequently, thereby providing smaller windows of time for comparison (measuring the amount of logged in users per twenty minutes, such as 12:00 PM to 12:12:20 PM, would provide an accurate normal activity level for comparison when the user attempts to login at 12:20 PM). Alternatively, trust engine 116 may be configured to apply statistical analyses, such as algorithms, exponential moving averages, and regression techniques, to the existing normal activity level data in order to deduce what the normal activity should be when accurate measurements are difficult to ascertain.

If trust engine 116 determines that the activity level of an application, system, network, or environment is normal (decision 206 "YES" branch), then trust engine 116 continues to measure the activity level of factors designated in step 202 (step 204). Continuing the example above, if the normal activity level of the mobile banking application is between 500 and 1000 users/hour, then user Alpha maintains a trust level of 3 when the mobile banking application experiences 750 users in the past hour, allowing Alpha to transfer, withdraw, and deposit money.

If trust engine 116 determines that the activity level of an application, system, network, or environment is abnormal (decision 206 "NO" branch), then trust engine 116 modifies the trust level assigned to associated users and/or devices (step 208). Upon detecting abnormal activity levels, trust engine 116 references the rules established in step 202 to determine which trust level should be assigned to corresponding users and devices. Continuing the example above, if the rules of the application provide that during highly abnormal levels of activity (1250+ users/hour) users are assigned a trust level of 1, user Alpha is assigned a trust level of 1 when the mobile banking application averages 3456 users over the past hour, allowing user Alpha to only view his or her accounts.

Trust engine 116 measures the activity levels of the factors designated in step 202 (step 210). While measuring the activity level of the factors is done is much the same manner as in step 204, measuring the activity levels in step 210 focuses on determining when the activity levels return to normal rather than determining when the activity levels become abnormal.

Trust engine 116 determines whether the activity level is normal in the same manner trust engine 116 determines whether the activity level is normal in decision 206 (decision 212).

If trust engine 116 determines that the activity level is abnormal (decision 212 "NO" branch), then trust engine 116 continues measuring the activity level of the application, system, network, or environment (step 210).

If trust engine 116 determines that the activity level is normal (decision 212 "YES" branch), then trust engine 116 modifies the trust level of associated users and devices (step 214). Trust engine 116 determines the appropriate trust level by referencing the rules established in step 202 which dictate what trust levels are appropriate under normal activity levels. Continuing the example above where the normal activity level of the mobile banking application is between 500 and 1000 users/hour, if the measured activity level is 700 users/hour (considered normal), then trust engine 116 assigns user Alpha a trust level of 3, providing Alpha the ability to transfer, withdraw, and deposit money.

Figure 3:
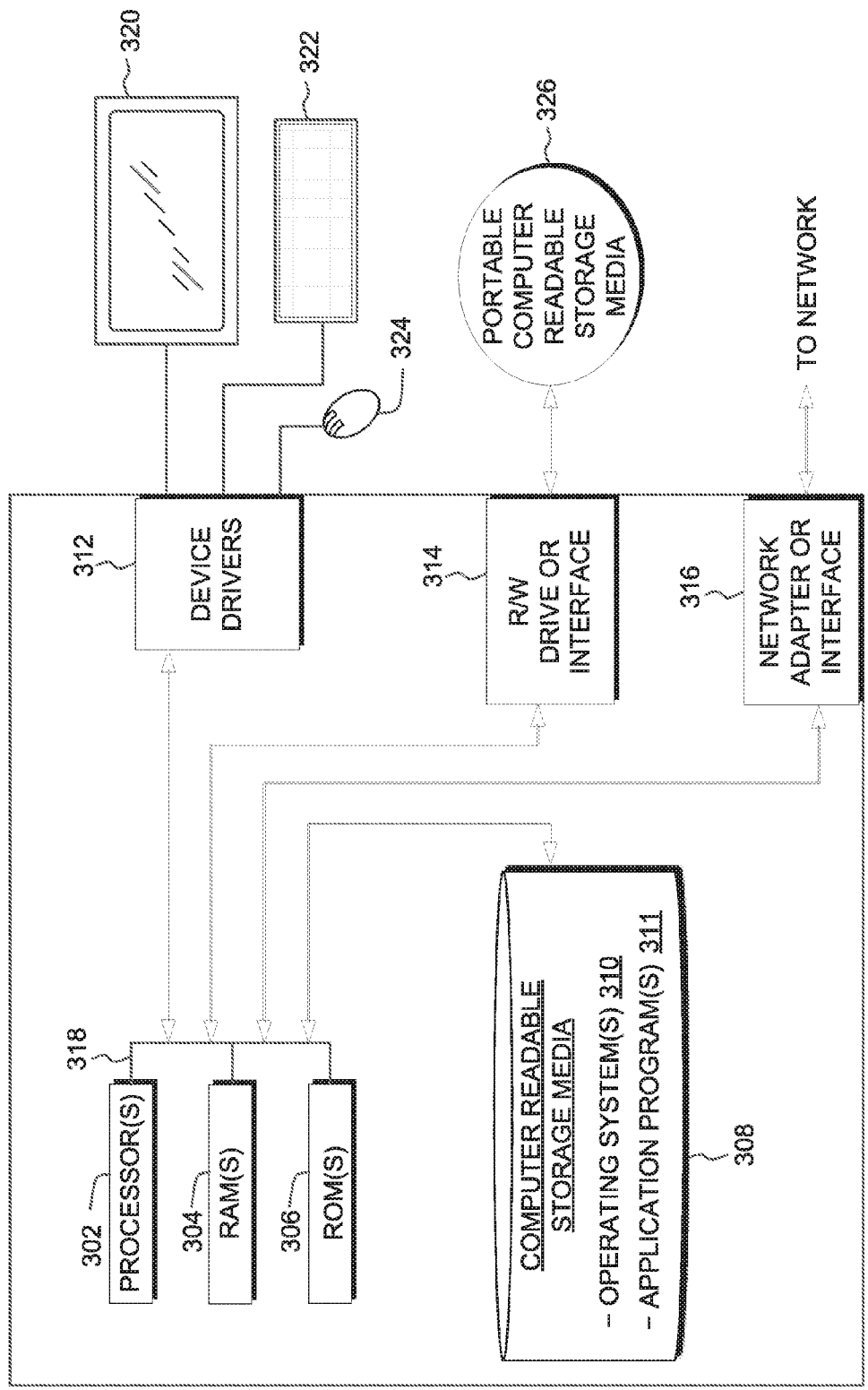
FIG. 3 is a block diagram depicting the hardware components of trust level modifying system 100 of FIG. 1, in accordance with an embodiment of the invention.

FIG. 3 depicts a block diagram of components of computing device 110 of an trust level modifying system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, trust engine 116, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 314 to read from and write to one or more portable computer readable storage media 326. Application programs 311 on computing device 110 may be stored on one or more of the portable computer readable storage media 326, read via the respective R/W drive or interface 314 and loaded into the respective computer readable storage media 308.

Computing device 110 may also include a network adapter or interface 316, such as a TCP/IP adapter card or wireless communication adapter (such as a 4G wireless communication adapter using OFDMA technology). Application programs 311 on computing device 110 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 110 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for trust level modification, the method comprising:

associating, by a processor of a computer having a non-transitory computer-readable storage medium, a first trust level, a second trust level, and a third trust level with an application, wherein the first trust level provides full access to the application, the second trust level provides less access to the application than the first trust level, and the third trust level provides no access to the application;

measuring, by the processor, a number of login attempts made to a server hosting the application;

based on the measured number of login attempts, determining, by the processor, a first range of login attempts, wherein the first range of login attempts is within a first predefined number of standard deviations from an average number of login attempts;

based on the measured number of login attempts, determining, by the processor, a second range of login attempts, wherein the second range of login attempts is outside of the first predefined number of standard deviations from the average number of login attempts;

based on the measured number of login attempts, determining, by the processor, a third range of login attempts, wherein the third range of login attempts is outside of a second predefined number of standard deviations from the average number of login attempts, and wherein the second predefined number of standard deviations is greater than the first predefined number of standard deviations;

measuring, by the processor, one or more current logins attempts made to the server hosting the application;

determining, by the processor, whether one or more rules are applicable to a time at which the one or more current login attempts are measured, wherein the one or more rules detail one or more circumstances which trigger modification of at least one of: the first range of login attempts, the second range of login attempts, and the third range of login attempts;

based on determining that the one or more rules are applicable, modifying, by the processor, at least one of: the first range of login attempts, the second range of login attempts, and the third range of login attempts;

determining, by the processor, whether the one or more current login attempts are within at least one of: the modified first range of login attempts, the modified second range of login attempts, and the modified third range of login attempts;

based on determining that the one or more current login attempts are within the modified first range of login attempts, assigning, by the processor, the first trust level to a user;

based on determining that the one or more current login attempts are within the modified second range of values, assigning, by the processor, the second trust level to the user;

based on determining that the one or more current login attempts are within the modified third range of login attempts, assigning, by the processor, the third trust level to the user;

determining, by the processor, whether the user is assigned at least one of: the second trust level and the third trust level;

based on determining that the user is assigned at least one of: the second trust level and the third trust level, measuring, by the processor, a second set of one or more current login attempts made to the server hosting the application, wherein the second set of one or more current login attempts are measured at a later time than the one or more current login attempts;

determining, by the processor, whether the second set of one or more current login attempts are back within the modified first range of login attempts; and based on determining that the second set of one or more current login attempts are back within the modified first range of login attempts, assigning, by the processor, the first trust level to the user.

* * * * *